June 15, 1965  K. B. BREDTSCHNEIDER  3,189,319
RENEWABLE VALVE SEAT CONSTRUCTION
Filed March 20, 1963
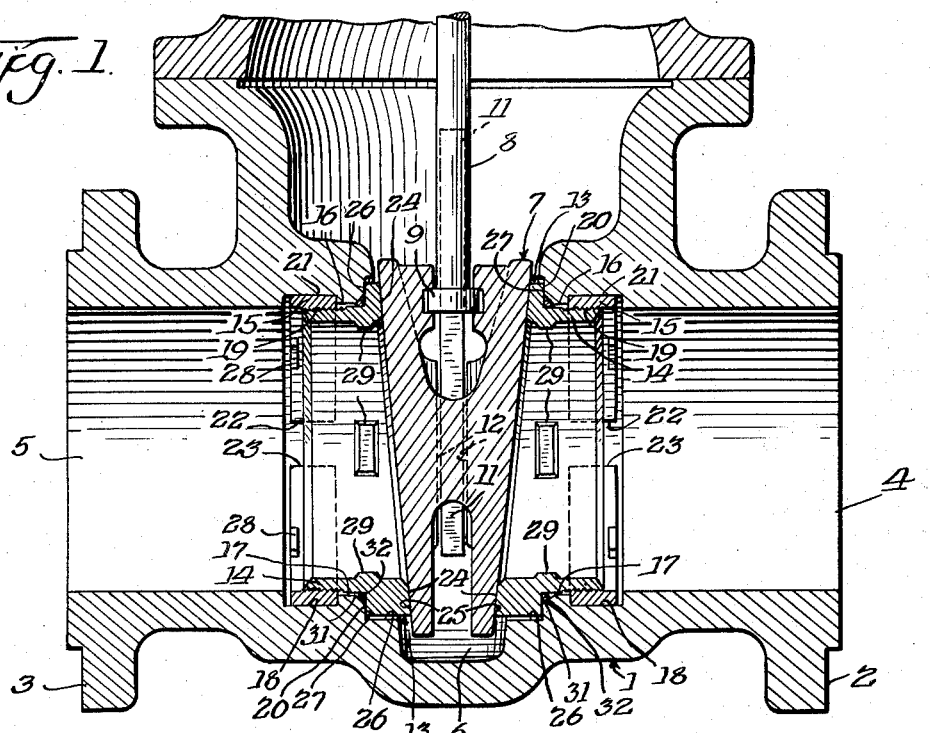
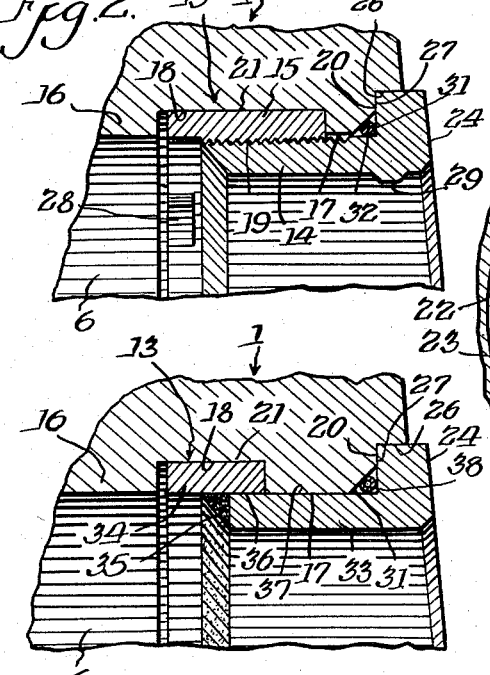
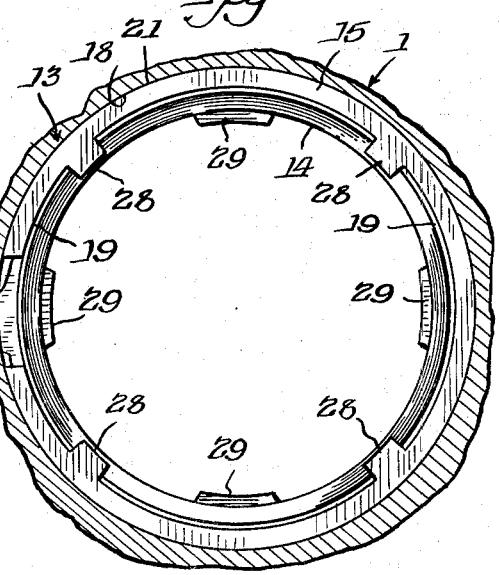
Inventor.
Kurt B. Bredtschneider.
By Joseph O. Large
Atty.

United States Patent Office 3,189,319
Patented June 15, 1965

3,189,319
RENEWABLE VALVE SEAT CONSTRUCTION
Kurt B. Bredtschneider, Chicago, Ill., assignor to Crane Co., Chicago, Ill., a corporation of Illinois
Filed Mar. 20, 1963, Ser. No. 266,690
3 Claims. (Cl. 251—328)

This invention relates generally to a valve construction, and, more particularly, it is concerned with a novel and durable renewable seat therefor.

At the outset, and in order to have a better appreciation of the background surrounding the practical use of this invention, it should be understood that heretofore valves have generally employed seat rings in which the latter are screw-threaded into the valve body. It will be appreciated that especially on gate valves, for example, it has been necessary to have such attaching threads extend in a plane perpendicular to the wedge angle of the gate valve closure member or wedge. Obviously, such construction is relatively costly to machine and in the past it has frequently been found to be inaccurate. Further, in many instances, when either inserting or removing such threaded seat rings, the thread either in the valve body or on the seat ring itself, or both, has been damaged. When such damage occurs in the valve body, it can only be repaired with extreme difficulty and expense.

Further, it will also be understood that many valve materials commonly employed, such as cast iron, ductile iron, and the like, are not inherently suitable or adapted to provide or permit a load carrying weld between the seat rings and the valve body to avoid the use of a threaded joint therebetween.

Therefore, it is one of the important objects of this invention to provide for a valve seat construction capable of being applied to a wide variety of valves in addition to gate valves.

Another important object is to provide for a valve seat construction in which it is unnecessary to employ attaching threads in the valve body and which also avoids the necessity of a load carrying weld being applied between the valve seat rings and the body.

Another object is to provide for a valve seat construction consisting of a pair of preferably telscoping annular members in which the assembly with the valve body can be easily and conveniently applied accurately to the valve body in a fluid sealing relationship.

Another object is to provide for a valve seat construction in which it is unnecessary to employ skilled help in either the removal or disassembly of the valve seat rings relative to the valve body.

A further object is to provide for a valve seat construction in which the closure member and the engaging seat ring members can be accurately fitted in place and suitably adjusted so that the wedge taper on the seat rings, for example, in the case of a wedge gate valve can be adjusted nicely to provide relatively easily a fluid tight seal between the engaging seat ring members and the closure member.

Another object is for a valve seat ring construction in which either screw thrusts or an annular fillet weld may be employed between the respective annular members constituting said seat construction.

Another object is to provide for a valve seat construction in which the threads employed between the telescoping seat ring members are easily maintained in a well protected condition between the assembly constituting the seats, the threads being removable with the ring portions constituting said seat and thereby enabling close and thorough inspection after the seat ring assembly is removed from the valve body. Further, the said telescoping members are easily replaced when and if it becomes necessary. This avoids the need for removing the valve body from the pipe line. This arrangement is effective not only during actual service, but also during the assembly or disassembly of said seat ring in original manufacture.

Another object is to provide for a seat construction comprising a plurality of telescoping members in which the assembly thereof permits of a fluid sealing connection with the valve casing without the necessity for employing independent fluid sealing means.

Other objects and advantages will become more readily apparent upon proceeding with the specification read in light of the accompanying drawings, in which:

FIG. 1 is a fragmentary sectional assembly view of a valve embodying my invention;

FIG. 2 is a fragmentary enlarged sectional assembly view of the construction of the novel seats forming the subject matter of this invention shown in FIG. 1;

FIG. 3 is an enlarged end view of the seat ring assembly shown in FIG. 2; and

FIG. 4 is a fragmentary sectional assembly view of a modified form of the invention.

Similar reference numerals refer to similar parts throughout the several views.

Referring now to FIG. 1, a conventional gate valve body or casing is shown designated 1, having the usual end disposed flanges 2 and 3 for respective attachment to a pipe line (not shown) and provided with respective ports 4 and 5 communicating with the said pipe line. The valve casing is provided with the usual centrally disposed chamber 6 having predetermined communication with the said ports 4 and 5 by means of a closure member 7 reciprocally movable within the said valve chamber. In this particular construction, the closure member is of wedge form and is suitably attached for reciprocal movement to a valve stem 8, having at an inner portion thereof a T-head 9 engaging the said wedge shaped closure member 7 as shown. The valve closure member 7 is guided in the usual arrangement with respect to the valve casing by means of the oppositely disposed guide ribs 11 engageable by oppositely disposed grooved surfaces on the closure member designated 12.

The closure member 7 in preferably the larger sizes of valves, although the invention is capable of use on smaller sizes, customarily makes contact with renewable valve seats mounted in the casing. It is in the form and arrangement of these valve seats generally designated 13 wherein this invention lies. The said seats 13 consist of a pair of telescoping annular members, the inner one or the seat contact portion of which being designated 14 and the outer one 15 surrounding the inner member 14. In order to receive the said telescopically arranged members 14 and 15, the valve casing is provided with an annularly disposed integral shoulder portion 16, the inner limits of said shouldered annular portions of the casing being defined by the ported or circular surfaces 17. The diametral reduction of the port as indicated at 17 provides for a recessed annular portion designated 18 within which recess the outer ring member 15 is snugly received as indicated. In explanation of such snug retention of the ring member 15 within the recess defined by the surface 18, it should be understood that initially the ring 15 while in its solid form is internally threaded as at 19. Upon completing the said threading at 19 and finishing the outer peripheral surfaces 21 to the desired dimensions relative to said recess, the said internally threaded ring is then split or cut away on the transverse surfaces as at 22 and 23 to provide a sufficient gap between the surfaces so as to allow for said snug retention of the peripheral surface 21 in its bearing against the receiving surface 18 of the recess. In other words, the ring 15 upon such splitting at 22 and 23 is drawn together to a smaller diameter to enable it to be sprung and inserted within the surface defined at 18 and then release into position to make said snug engagement with the surface 18 as illustrated. It will be appreciated, of course, that the threads as indicated at 19 are accurately figured based upon the gap provided by the surfaces 22 and 23 and are so provided in the released ring 15 made after the thread is cut on the solid ring whereby the gap at 22 and 23 must be equal to or greater than twice the depth of the undercut multiplied by $\pi$ (3.1416). This enables releasing sufficiently and spring it into and substantially fill the undercut portion 18 of the valve body.

It will, of course, be understood that this split ring snugly contacts the inside diameter of the undercut portion 18 and therefore the gap in the ring 15 has no objectionable effect upon the strength of the thread engagement between the seat ring 14 and the rotatable split ring 15. The seat ring 14 is provided with the usual annular tapered surface 24 for engagement with the similarly tapered surface 25 of the closure membre 7. It will, of course, be appreciated that in providing said tapered surface 24, the seat ring 14 is necessarily of gradually increasing thickness at its annular shoulder portion and is received relatively snugly within the recessed portion 26 as shown of the casing 1. Thus, the shouldered seat ring 14 is inserted in the body recess 26 concentric to the valve horizontal axis and is drawn against the valve body transverse annular surface 27 by means of the split threaded ring 15 rotatably mounted in the casing recess 18 and by suitable rotation providing for said tightening of the ring 14 against the surface 27. It will be appreciated that a suitable tool (not shown) is applied to the lugs 28 and upon suitable rotation of the said split ring 15 the tightening of the ring 14 is effected as above stated.

It should be understood that in holding the shouldered seat portion 14 in accurate aligned position with respect to the wedge surface 24 closely with the inclined surface 25 of the closure member 7 that the lugs 29 are held firmly to prevent rotation, while the closure member is in desired position as shown. It will be appreciated that by such positioning of the latter member in relation to the valve seat contact surfaces 24, the accuracy of the said ring assembly is carefully and accurately controlled.

Actually, tests can be made while such assembly is being effected to determine whether or not desired valve tightness is taking place. It will also be understod that after the seat ring 14 is in contact with the valve body as desired, it is firmly held in this position by either the valve closure member or a substitute dummy disc construction therefor. Thus, the latter member serves as a disc gauge to establish and measure accurately the desired spacing and slope or pitch between the valve seat rings 14 and their contact surfaces 24. Additional rotation of the split ring 15 with tool engaging lugs 28 applied on the latter ring permits tightening the seat ring against the valve body shoulder 27. It will also be noted that in an annular recessed portion formed by the chamfered annual surface in the casing at 31, a suitable O-ring 32 is fitted therebetween to provide a fluid sealing relationship between the seat ring 14 and the casing or body 1. Of course, in many cases, the machined seat between the respective annular surfaces 20 and 27 may be sufficient for the purpose without the necessity for employing a separate fluid sealing means.

In a further modification, as shown more clearly in FIG. 4, in place of the threaded connection as at 19 in FIGS. 1 to 3 inclusive, it may be desirable under certain installations to effect such ring assembly 13 of the ring portions 14 and 15 shown in the other figures a welded connection. Thus, as shown in FIG. 4, a welded connection may be used to join the respective seat rings 33 with the split retaining ring member 34, both being annularly welded together by means of the annular fillet weld 35. It will be apparent then that in place of said threaded connection, the bored portion 36 receives the turned portion 37 of the seat ring 33 whereby to effect a fluid sealing connection in a manner similar to that previously described in connection with FIGS. 1 to 3 inclusive. It will, of course, be understood that the ring member 34 in order to be received within the casing recess 18 is necessarily split (not shown) and further that if desired between the surfaces 20, 37 and 31, an O-ring 38 is mounted within the space provided by the chamfered surface 31. However, in order to avoid damage to such O-ring indicated at 38, the latter member should preferably be metallic or of the self-energizing type in order to withstand advanced temperatures caused by making the weld 35.

It will also be appreciated in the fastening method herein described in connection with FIG. 4 where the split ring 34 is welded to the seat ring 33, the welding at 35 is done while the seat ring is being pressed against the valve body shoulder 27 by either the valve closure member 7 or a dummy disc (not shown) in the same manner as described in connection with FIGS. 1 to 3 inclusive.

It should also be understood that the shrinkage of the weld 35 when cooling will draw the seat ring 33 tightly against the surface 27 to further increase the opportunity for effecting a tight fluid relationship between the body seat ring 33 and the valve casing 1. In further explanation, such shrinkage as referred to takes place in connection with the seat member 33 because the latter member will become extremely hot during the normal course of welding and upon upon cooling will shrink or contract to further enhance the fluid seal referred to. Considering the FIG. 4 construction, and as mentioned in connection with the description of FIGS. 1 to 3 inclusive, it will of course be understood that the sealing O-ring 38 may be dispensed with when deemed necessary or desirable, depending upon the service conditions encountered in the field.

While a pair of embodiments have been shown and described covering my invention, it will of course be understood that this has been done only for purpose of illustration and not of limitation. Therefore, the scope of the invention should be measured by the appended claims.

I claim:

1. In a renewable seat ring assembly for valves or the like, the combination of a valve closure member and a valve body having a port with an outer end, an intermediate annular recess, and an inner annular shoulder portion;

a body seat ring, the said seat ring comprising first and second telescopically arranged relatively rotatable annular members, the first said annular member being received within said annular recess and being joined by interengaging means thereon to said annular member;

said body port recess substantially removed from said outer end portion of said body port;

the first one of said pair of telescopically arranged annular members comprising split ring means snugly disposed in said annual recess;

said split ring means being mounted over an end portion of the said second annular member;

the said second anular member providing the seat contact for the said closure member;

the said second of said telescoped annular members having an annular shoulder portion for engagement with said body port inner annular shoulder portion upon predetermined positioning of the second one of said telescoped members, the said engaged shoulder portions being in spaced apart relation to the said body recess and the first of said telescoped members.

2. The subject matter of claim 1, the said split ring means being rotatable and having threads thereon engaging said second annular member of said telescopically arranged members at said end portion to provide said retaining function.

3. The subject matter of claim 1, the said split ring means having an annular fillet weld on an inner diametral portion thereof joining said second annular member of said telescopically arranged annular members to said split ring means to provide said retaining function.

References Cited by the Examiner
UNITED STATES PATENTS

| 1,598,244 | 8/26 | Crook | 251—329 |
| 2,330,610 | 9/43 | Natter | 251—360 X |

FOREIGN PATENTS

| 6,679 | 1898 | Great Britain. |
| 9,822 | 1889 | Great Britain. |
| 18,269 | 1902 | Great Britain. |

M. CARY NELSON, *Primary Examiner.*